United States Patent
Liu et al.

(10) Patent No.: US 9,739,972 B2
(45) Date of Patent: Aug. 22, 2017

(54) OPTICAL INSPECTION DEVICE AND OPTICAL INSPECTION FIXTURE THEREOF

(71) Applicants: GLOBAL UNICHIP CORPORATION, Hsinchu (TW); TAIWAN SEMICONDUCTOR MANUFACTURING CO., LTD., Hsinchu (TW)

(72) Inventors: Chang-Ming Liu, Hsinchu County (TW); Tsung-Ju Hsieh, Hsinchu County (TW)

(73) Assignees: GLOBAL UNICHIP CORPORATION, Hsinchu (TW); TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 54 days.

(21) Appl. No.: 14/953,409

(22) Filed: Nov. 29, 2015

(65) Prior Publication Data
US 2017/0052340 A1 Feb. 23, 2017

(30) Foreign Application Priority Data
Aug. 19, 2015 (TW) .............................. 104127028 A

(51) Int. Cl.
*G01R 31/00* (2006.01)
*G02B 7/02* (2006.01)
(Continued)

(52) U.S. Cl.
CPC ............... *G02B 7/02* (2013.01); *G02B 7/006* (2013.01); *H02S 50/10* (2014.12)

(58) Field of Classification Search
CPC .............. G02B 7/02; H01L 27/4618; H01L 2924/01077; H01L 2924/1532; H01L 2924/1615; H01L 2224/05573; H01L 2224/05568; H01L 2224/056; H01L 2224/05548; G01R 31/31924; G01R 31/31922; G01R 31/2887; G01R 31/2886; G01R 31/2851; G01R 31/311;
(Continued)

(56) References Cited

U.S. PATENT DOCUMENTS 3,490,832 A * 1/1970 Akita .................... A61B 3/032
351/236
5,394,246 A * 2/1995 Sugawara .......... G01N 21/8806
348/131

(Continued)

FOREIGN PATENT DOCUMENTS

CN 102313826 A 1/2012
TW M374563 U1 2/2010

*Primary Examiner* — Thang Le
(74) *Attorney, Agent, or Firm* — CKC & Partners Co., Ltd.

(57) ABSTRACT

An optical inspection fixture includes a first bracket, a second bracket and at least one loading surface. The first bracket is provided with at least one first arm. The second bracket and the first bracket are separated from each other so as to define a light traveling path that lights can go through. The second bracket is provided with at least one second arm which is separated from the first arm. The loading surface is between the first bracket and the second bracket, and connected to at least one of the first arm and the second arm, and the loading surface is used to carry an optical conversion element.

13 Claims, 6 Drawing Sheets

(51) Int. Cl.
*H02S 50/10* (2014.01)
*G02B 7/00* (2006.01)

(58) Field of Classification Search
CPC .............. G01R 31/2656; G01R 31/308; G01R 31/2831; G01R 31/2648; G01R 1/0408; G01R 1/04; G01R 1/071; G01R 13/04; G01R 13/38; G01R 5/10
USPC ............ 324/750.01, 750.23, 754.23, 756.01, 324/754.07, 158, 765, 760
See application file for complete search history.

(56) References Cited

U.S. PATENT DOCUMENTS

| | | | |
|---|---|---|---|
| 6,362,877 B1 * | 3/2002 | Kobayashi | G01R 31/281 257/E21.53 |
| 6,462,814 B1 * | 10/2002 | Lo | G01N 21/956 356/237.2 |
| 7,177,378 B2 | 2/2007 | Baldemair et al. | |
| 7,642,792 B2 | 1/2010 | Jager | |
| 2006/0214673 A1 * | 9/2006 | Tamai | H04N 17/002 324/754.23 |
| 2008/0218186 A1 * | 9/2008 | Kooiman | G01R 31/311 324/754.07 |
| 2012/0155530 A1 | 6/2012 | Zhong | |
| 2012/0305815 A1 * | 12/2012 | Johnson | G01B 11/2425 250/559.01 |
| 2014/0258951 A1 | 9/2014 | Danti et al. | |
| 2015/0355100 A1 * | 12/2015 | Tsuda | G01J 1/0271 356/237.2 |

\* cited by examiner

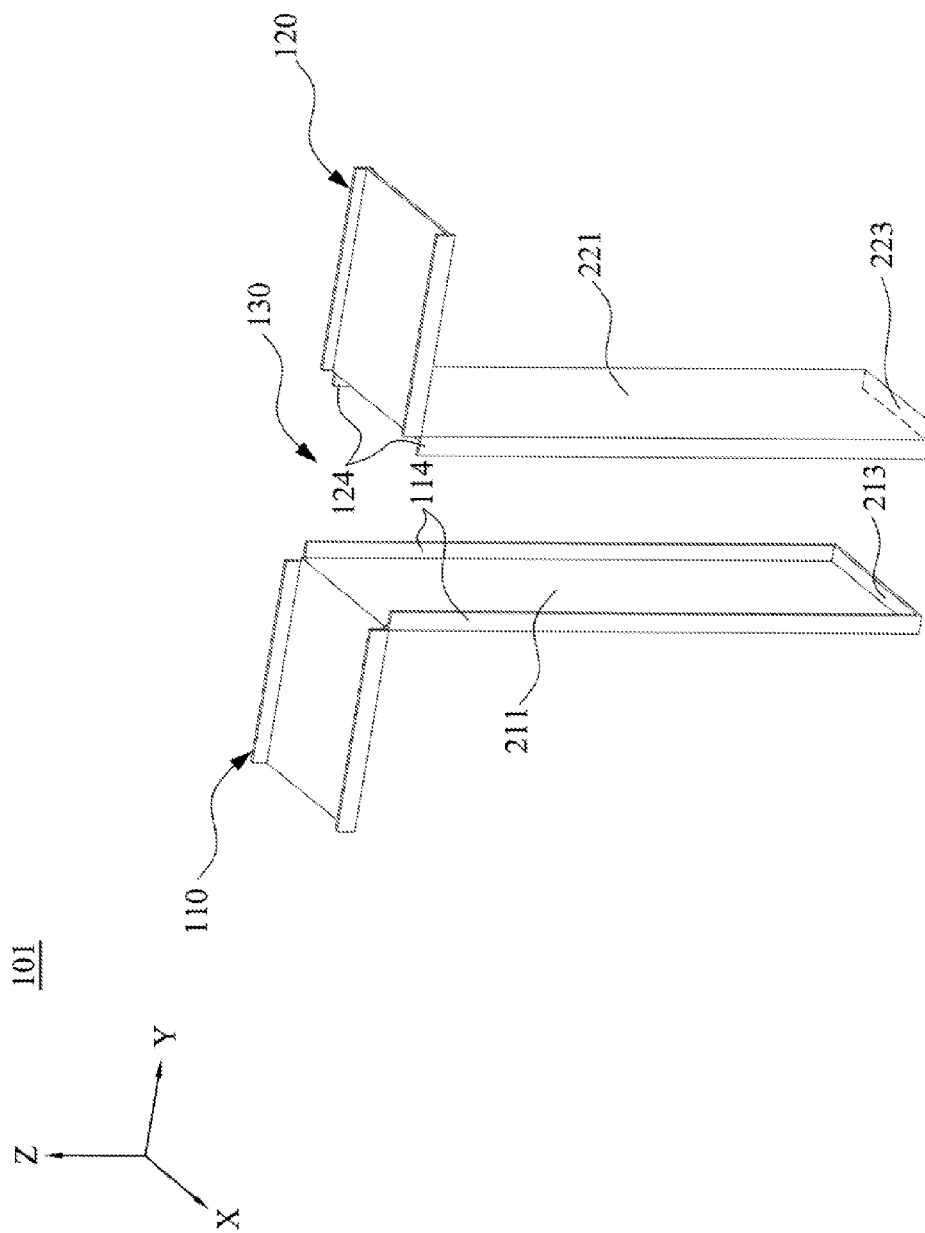

OPTICAL INSPECTION DEVICE AND OPTICAL INSPECTION FIXTURE THEREOF

RELATED APPLICATIONS

This application claims priority to Taiwan Application Serial Number 104127028, filed Aug. 19, 2015, which is herein incorporated by reference.

BACKGROUND

Field of Disclosure

The present disclosure relates to an inspection device. More particularly, the present disclosure relates to an optical inspection device.

Description of Related Art

In general, a testing card for testing an image sensor chip normally is installed with an optical conversion element above the image sensor chip so that testing lights with proper optical conditions can be provided to the image sensor chip for quickly inspecting that whether the image sensor chip is defected.

However, when an optical conversion element is placed on the testing card to optically couple with an image sensor chip, the testing card may block the testing lights to the image sensor chip so as to degrade the light intensity of the testing lights and to further affect the testing result of the image sensor chip.

Therefore, ways in which to provide a solution to effectively solve the aforementioned inconvenience and shortages and to increase the competitiveness of industries will be seriously concerned.

SUMMARY

An aspect of the disclosure is to provide an optical detection device and an optical detector fixture thereof to overcome the defects and inconvenience of the prior art.

According to one embodiment, the optical inspection fixture includes a first bracket, a second bracket and at least one loading surface. The first bracket is provided with at least one first arm. The second bracket and the first bracket are separated from each other so that a light traveling path that lights from a light source are able to go through is defined therebetween. The second bracket is provided with at least one second arm which is separated from the first arm. The loading surface is between the first bracket and the second bracket, and connected to at least one of the first arm and the second arm, and the loading surface is used to carry an optical conversion element.

Therefore, since the light traveling path is not completely surrounded by the optical inspection fixture of the embodiment, the optical conversion element is able to receive greater amount of lights from more directions so that the lights for the light traveling path will not be blocked excessively. Thus, the embodiment not only requires the optical conversion element to be as close to the image sensing chip as possible, but must also maintain the light intensity of the lights to the optical conversion element from the light source thereby reducing the risk of the test results of the image sensor chip being affected.

Based upon the foregoing embodiment, in one specific optional embodiment, the first arm and the second arm respectively extend in a first axial direction and the loading surface extends in a second axial direction, which is perpendicular to the first axial direction.

Based upon the foregoing embodiment, in one specific optional embodiment, when the number of the first arms, the second arms and the loading surfaces are respectively plural, at least one first gap is formed between the first arms, at least one second gap is formed between the second arms, and the light traveling path is connected to the first gap and the second gap. The loading surfaces are disposed in the light traveling path, and the loading surfaces are respectively connected to the first arms and the second arms, and the first gap and the second gap respectively separate the loading surfaces.

Based upon the foregoing embodiment, in one specific optional embodiment, when the number of the first arm and the number of the second arm are respectively single and the number of the loading surface is two, the two loading surfaces are disposed in the light traveling path, and the two loading surfaces are respectively connected to the single first arm and the single second arm, and the single first arm and the single second arm are separated by the light traveling path.

Based upon the foregoing embodiment, in one specific optional embodiment, the optical inspection fixture further includes a sleeve, and the sleeve includes a tubular body, a receiving space and an opening. One end of the tubular body is connected to both of the first bracket and the second bracket. The receiving space is formed on the end of the tubular body, and the opening is formed on the other end of the tubular body so that the loading surface is formed on an inner surface of the other end of the tubular body. The receiving space is connected to the opening and the light traveling path.

Based upon the foregoing embodiment, in one specific optional embodiment, the first bracket is further provided with a first position-limited strip, the second bracket is further provided with a second position-limited strip, wherein the first position-limited strip and the second position-limited strip respectively extend in the first axial direction and the first position-limited strip and the second position-limited strip are used to prevent the optical conversion element from leaving the light traveling path.

Based upon the foregoing embodiment, in one specific optional embodiment, one end of the first bracket opposite to the loading surface is provided with a first carrying portion, and one end of the second bracket opposite to the loading surface is provided with a second carrying portion, and the light traveling path is arranged between the first carrying portion and the second carrying portion.

According to another embodiment, the optical inspection device includes an optical conversion element, the aforementioned optical inspection fixture and a light source. The light source is used for emitting lights to a chip through the light traveling path via the optical conversion element.

Thus, since the aforementioned optical inspection fixture does the optical conversion element to be close to the image-sensing chip as possible, but also will not degrade the light intensity of the lights from the light source so as to avoid the testing result of the image sensor chip being affected.

Base upon the foregoing embodiment, in one specific optional embodiment, the optical conversion element is a lens or a diffuser.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

FIG. 4 is a perspective view of an optical inspection fixture according to a second embodiment of the disclosure.

DESCRIPTION OF THE EMBODIMENTS

Figure 1:
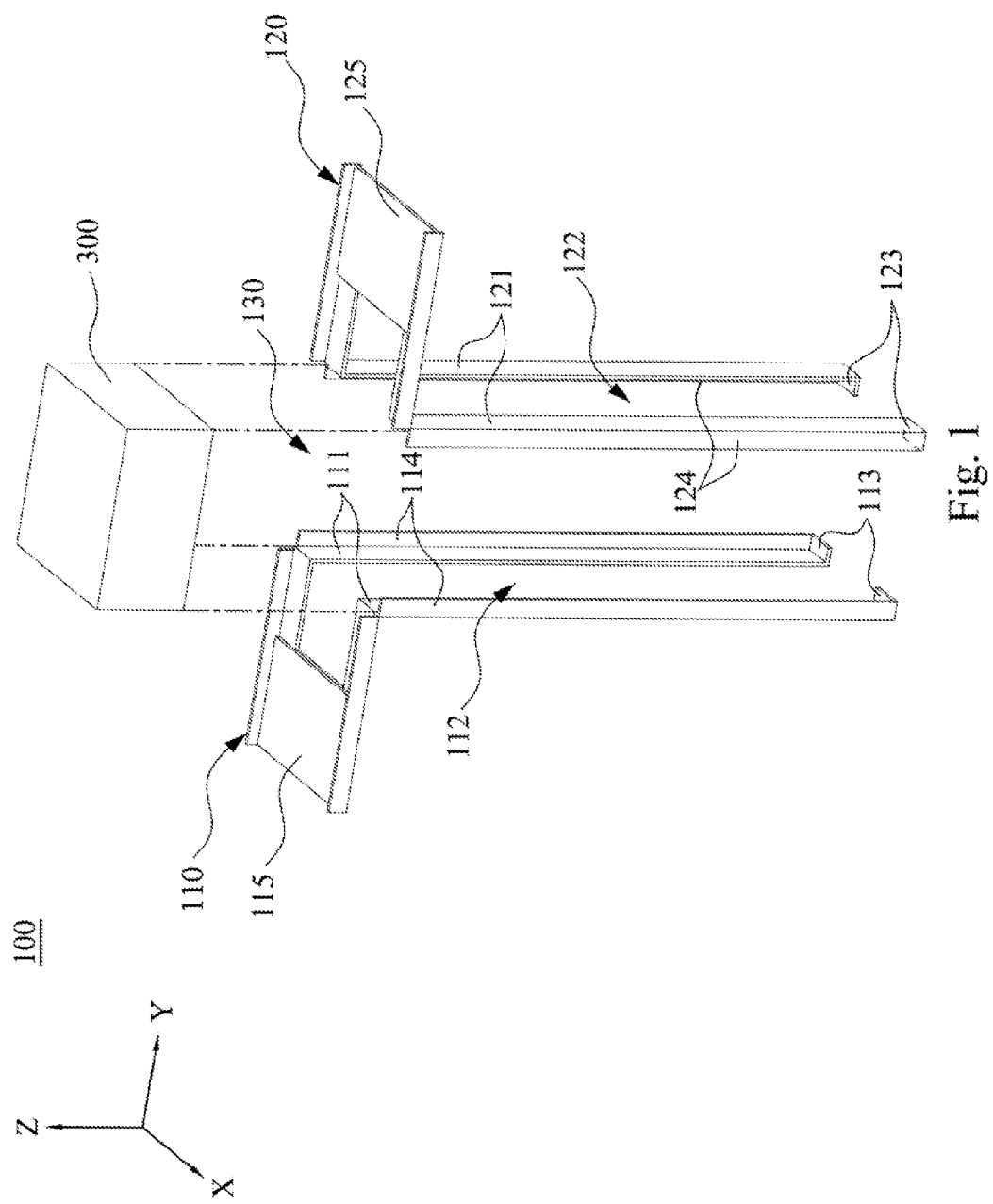
FIG. 1 is a disassembled view of an optical inspection fixture and an optical conversion element according to a first embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the present disclosure without departing from the scope or spirit of the disclosure.

In the aforementioned prior art above, when the optical conversion element is optically coupled with the image sensor chip, the testing card normally shades the testing lights for the image sensor chip so as to degrade the light intensity of the testing lights for the image sensor chip and to further affect the testing result of the image sensor chip. Thus, the optical inspection fixture of the disclosure includes two brackets and at least one loading surface. A light traveling path that lights from a light source are able to go through is defined between the brackets, and the loading surface is arranged between the brackets on the light traveling path for carrying the optical conversion element.

Therefore, since the light traveling path is not completely surrounded by the optical inspection fixture of the embodiment, the optical conversion element is able to receive greater amount of lights from more directions so that the lights for the light traveling path will not be blocked excessively. Thus, the embodiment not only does the optical conversion element to be close to the image sensing chip as possible, but also can maintain the light intensity of the lights to the optical conversion element from the light source thereby reducing the risk of the test results of the image sensor chip being affected.

First Embodiment

Figure 2:
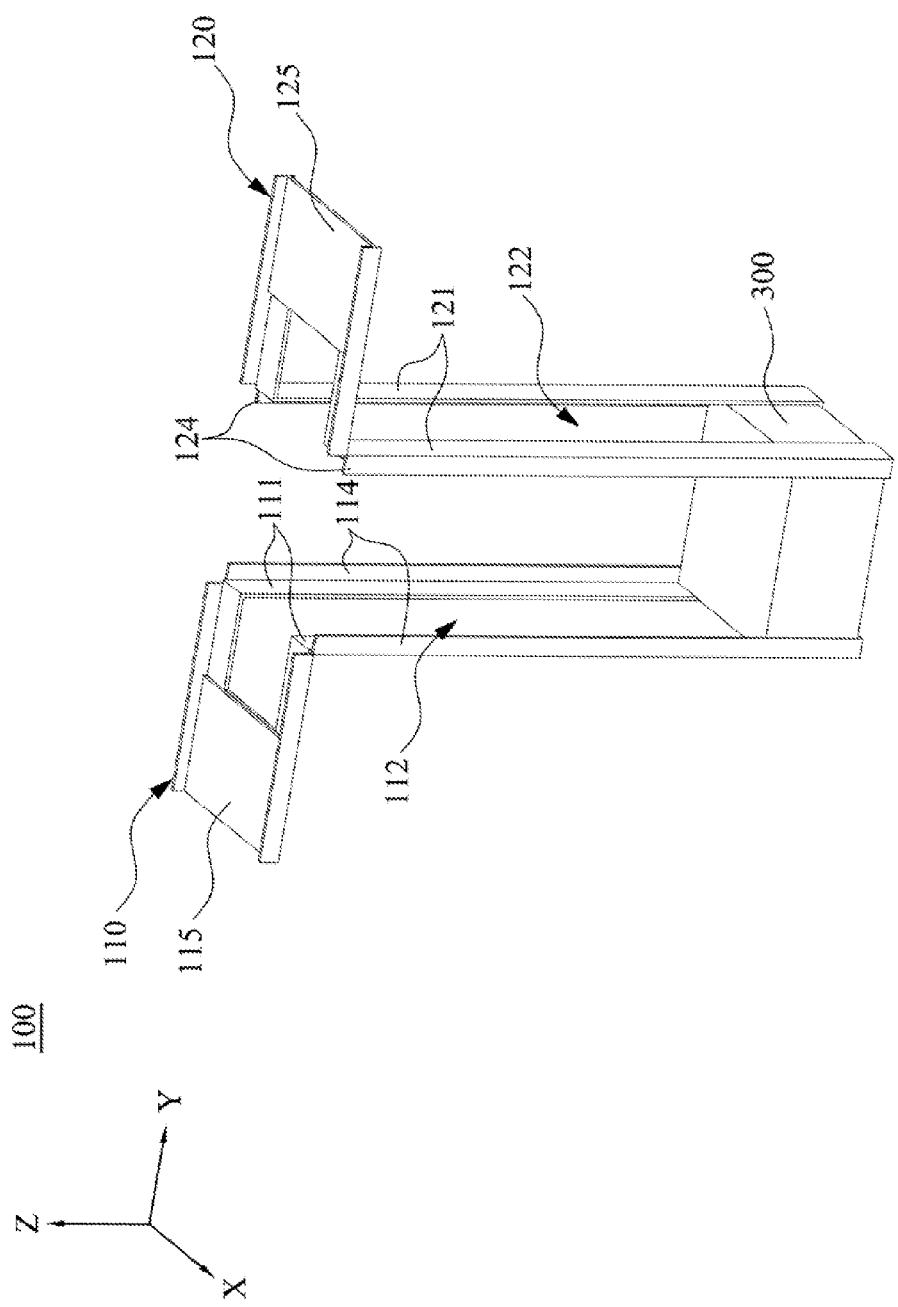
FIG. 2 is an assembled view of the optical inspection fixture and the optical conversion element of FIG. 1.

Reference is now made to FIG. 1 and FIG. 2 in which FIG. 1 is a disassembled view of an optical inspection fixture 100 and an optical conversion element 300 according to a first embodiment of the disclosure, and FIG. 2 is an assembled view of the optical inspection fixture 100 and the optical conversion element 300 of FIG. 1. As shown in FIG. 1 and FIG. 2, the optical inspection fixture 100 includes a first bracket 110 and a second bracket 120. The first bracket 110 and the second bracket 120 are separated from each other, or even totally separated so that a light traveling path 130 is defined between the first bracket 110 and the second bracket 120. The first bracket 110 is provided with two first arms 111. The second bracket 120 is provided with two second arms 121. The light traveling path 130 separates the first bracket 110 and the second bracket 120.

The first bracket 110 is further provided with a first loading portion having two first loading surfaces 113. Each of the first loading surfaces 113 is connected to a distal end of one of the first arms 111. The second bracket 120 is further provided with a second loading portion having two second loading surfaces 123. Each of the second loading surfaces 123 is connected to a distal end of one of the second arms 121. The first arms 111 and the second arms 121 extend in a first axial direction (see Z axis) and the first loading surfaces 113 and the second loading surfaces 123 extend in a second axial direction (see X axis or Y axis) which is perpendicular to the first axial direction. The first loading surfaces 113 and the second loading surfaces 123 are on the light traveling path 130 to mutually carry an optical conversion element 300 thereon.

Preferably, the first loading surfaces 113 and the second loading surfaces 123 are coplanar so that the optical conversion element 300 can be steadily placed on the first loading surfaces 113 and the second loading surfaces 123. However, the first loading surfaces 113 and the second loading surfaces 123 do not have to be coplanar in the disclosure.

Furthermore, a first gap 112 is formed between the first arms 111. The first gap 112 completely separates the first arms 111, and also completely separates the first loading surfaces 113. A second gap 122 is formed between the second arms 121. The second gap 122 completely separates the second arms 121, and also completely separates the second loading surfaces 123.

Figure 3A:
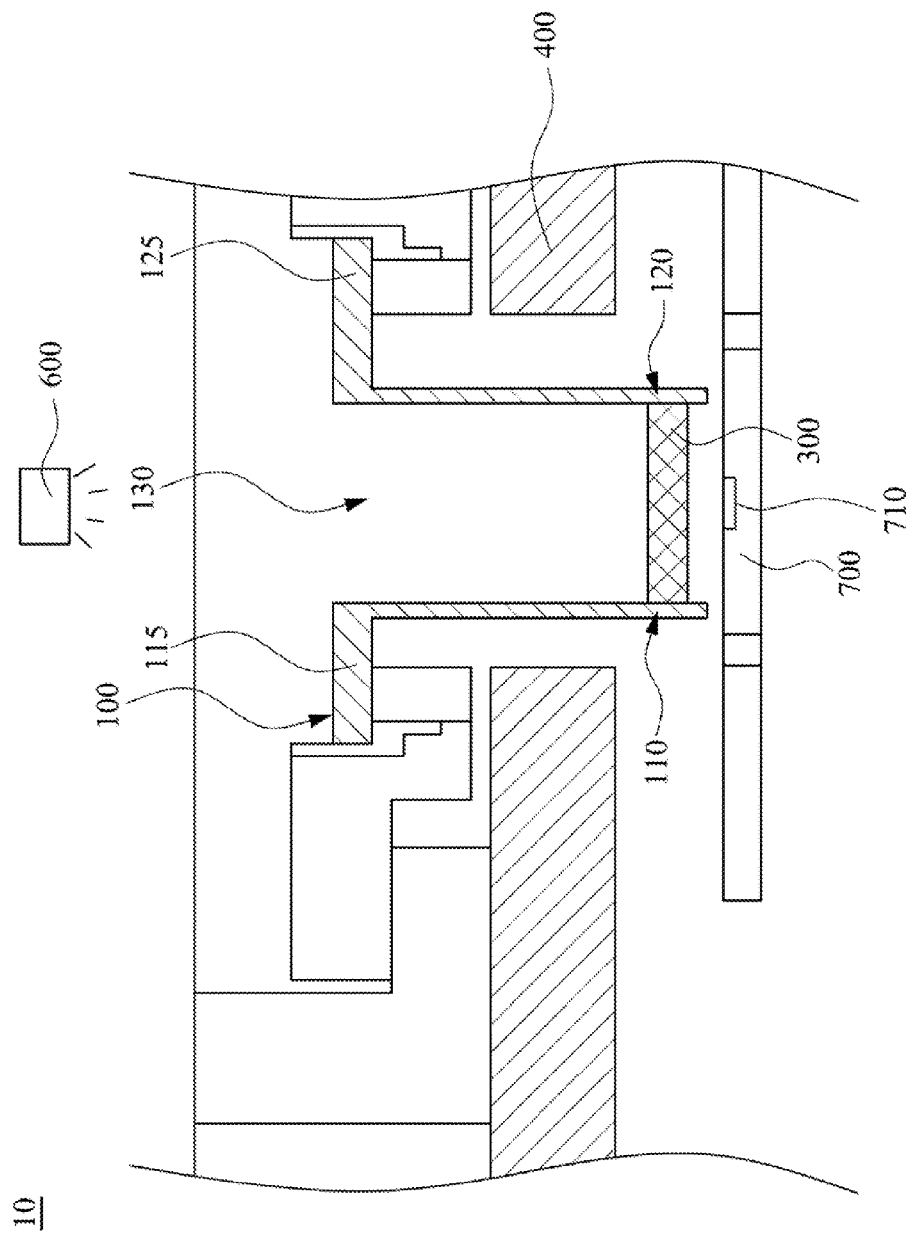
FIG. 3A is a schematic view of an optical inspection device having the optical inspection fixture of FIG. 1.

FIG. 3A is a schematic view of an optical inspection device 10 having the optical inspection fixture 100 of FIG. 1. As shown in FIG. 2 and FIG. 3A, the optical inspection device 10 includes a testing card 400, the aforementioned optical conversion element 300, the optical inspection fixture 100 and a light source 600. The light source 600 is disposed on one side of the optical inspection fixture 100 opposite to the optical conversion element 300, and the light source 600 optically couples to the optical conversion element 300 through the light traveling path 130. However, the position of the light source 600 is not limited in the disclosure as long as the light source 600 is able to emit lights to the optical conversion element 300 via the light traveling path 130.

Thus, when the optical inspection fixture 100 is secured on the testing card 400, and the optical conversion element 300 carried on the optical inspection fixture 100 faces towards to a chip-sensing area 710 disposed on a top surface of a tested chip 700 (e.g., optoelectronic chip) for optically coupling the chip-sensing area 710, the light source 600 then emits lights to the chip sensing area 710 of the tested chip 700 through the optical conversion element 300 via the light traveling path 130 so that the follow-up testing steps may be continued on the testing card 400.

Therefore, since more openings are exposed from the first gap 112 and the second gap 122 of the optical inspection fixture 100, the optical conversion element 300 is able to receive greater amount of lights from the first gap 112 and the second gap 122 so that the lights for the light traveling path 130 will not be blocked excessively so as to provide sufficient light intensity, thereby reducing the risk of the test results being affected.

In the embodiment, each of the first arms 111 is further provided with a first position-limited strip 114 connected the first arm 111. Each of the second arms 121 is further provided with a second position-limited strip 124 connected the second arm 121. The first position-limited strips 114 are facing to each other, and the first position-limited strips 114 respectively extend in the first axial direction (see Z axis). The second position-limited strips 124 are facing to each other, and the second position-limited strips 124 respectively extend in the first axial direction (see Z axis).

When the optical conversion element 300 is placed on the first loading surfaces 113 and the second loading surfaces 123, the optical conversion element 300 can be limited in the light traveling path 130 by the first position-limited strips 114 and the second position-limited strips 124, thus the first position-limited strips 114 and the second position-limited strips 124 can prevent the optical conversion element from leaving the light traveling path.

Furthermore, one end of the first bracket 110 opposite to the first loading surface 113 is provided with a first carrying portion 115. One end of the second bracket 120 opposite to the second loading surface 123 is provided with a second carrying portion 125. The light traveling path 130 is arranged between the first carrying portion 115 and the second carrying portion 125. Thus, with the function of the first carrying portion 115 and the second carrying portion 125, the optical inspection fixture 100 can be secured on the testing card 400 to have the optical conversion element 300 to optically couple to the chip sensing area 710 of the tested chip 700.

Preferably, the first carrying portion 115 and the second carrying portion 125 are coplanar so that the optical inspection fixture 100 can be steadily coupled with the testing card 400. However, the first carrying portion 115 and the second carrying portion 125 do not have to be coplanar in the disclosure, and the optical inspection fixture 100 of the disclosure does not have to place on the testing card 400 by the first carrying portion 115 and the second carrying portion 125.

Figure 3B:
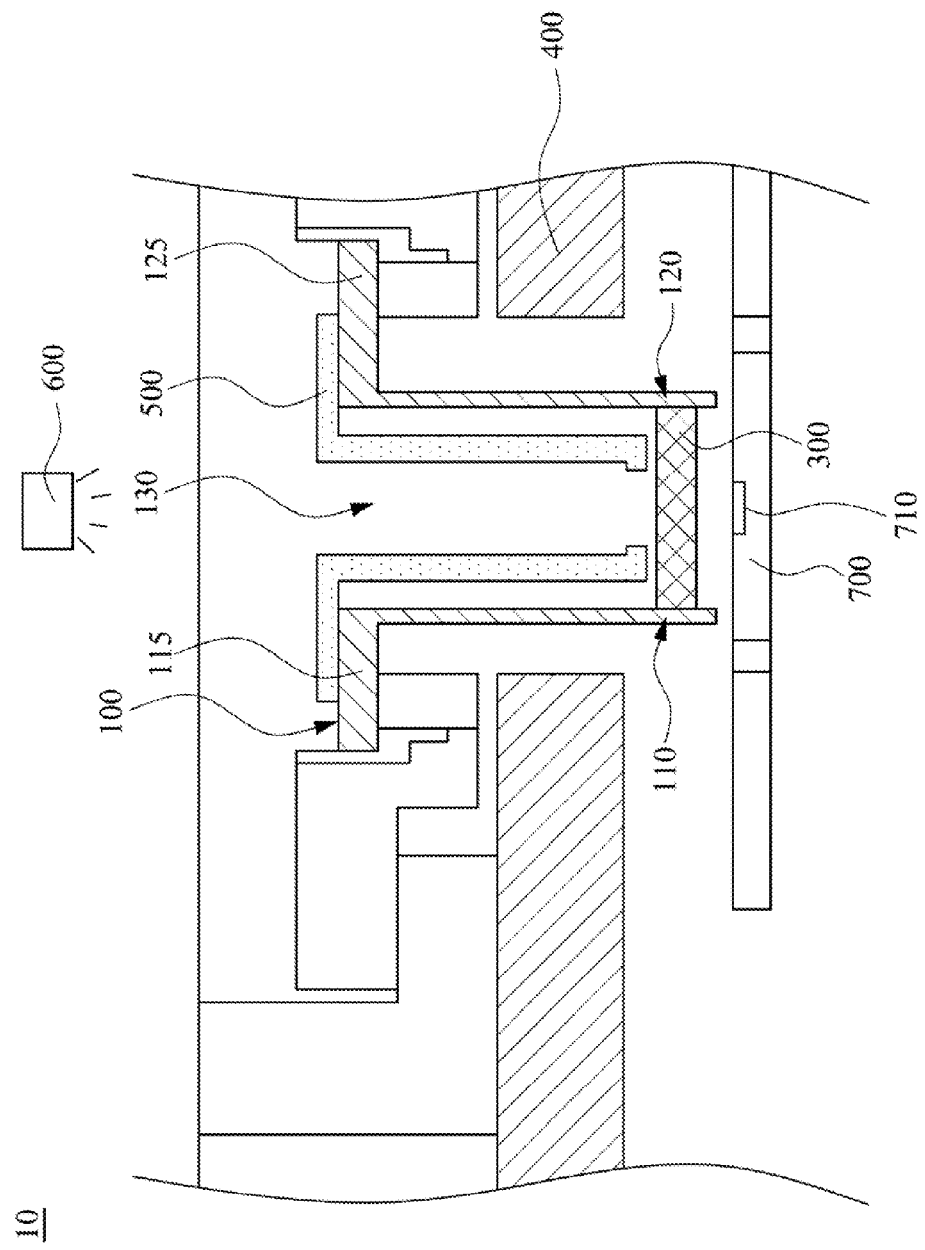
FIG. 3B is a schematic view of an optical inspection device according to another option of the first embodiment thereof.

FIG. 3B is a schematic view of an optical inspection device 10 according to another option of the first embodiment thereof. As shown in FIG. 3B, in this option thereof, in order to place the optical conversion element 300 on the first loading surfaces 113 and the second loading surfaces 123 steadily, at least one position-adjusting element 500 can be alternatively chosen to be installed in the light traveling path 130 so that the optical conversion element 300 can be adjusted to the appropriate position of the optical inspection fixture 100 for carrying on the follow-up tests.

It is noted, after the optical conversion element 300 is adjusted to the appropriate position of the optical inspection fixture 100, the position-adjusting element 500 is then removed for carrying on the follow-up tests; or the position-adjusting element 500 still can be remained on the optical inspection fixture 100 if the light intensity of the lights will not be degraded. However, the disclosure is not limited thereto, the form and sort of the described position-adjusting element are merely few of options, or the described position-adjusting element even may be omitted.

Second Embodiment

FIG. 4 is a perspective view of an optical inspection fixture 101 according to a second embodiment of the disclosure. The optical inspection fixture 101 of the second embodiment and the optical inspection fixture 100 of the first embodiment are substantially the same, expect that, as shown in FIG. 4, the first bracket 110 is provided with a single first arm 211 and a single first loading portion having a single first loading surface 213, and the second bracket 120 is provided with a single second arm 221 and a single second loading portion having a single second loading surface 223. The single first arm 211 and the single second arm 221 are separated by the light traveling path 130; even, the single first arm 211 and the single second arm 221 are completely separated by the light traveling path 130. The single first loading surface 213 is connected to one distal end of the single first arm 211, the single second loading surface 223 is connected to one distal end of the single second arm 221, and the single first loading surface 213 and the single second loading surface 223 are disposed in the light traveling path 130.

Thus, since the single first loading surface 213 and the single second loading surface 223 are arranged oppositely in the light traveling path 130, an optical conversion element can be placed on the single first loading surface 213 and the single second loading surface 223 with two opposite sides of the optical conversion element. Preferably, the single first loading surface 213 and the single second loading surface 223 are coplanar so that the optical conversion element can be steadily placed on the single first loading surface 213 and the single second loading surface 223. However, the single first loading surface 213 and the single second loading surface 223 do not have to be coplanar in the disclosure.

It is noted that although the single first arm 211 and the single second arm 221 might shade the lights, however, since the first bracket 110 and the second bracket 120 are completely separated by the light traveling path 130, lights will not be blocked along the direction of X axis in the light traveling path 130. Thus, the light traveling path 130 has a slot with sufficient room, which is advantageous for the optical conversion element to receive enough lights.

Third Embodiment

Figure 5:
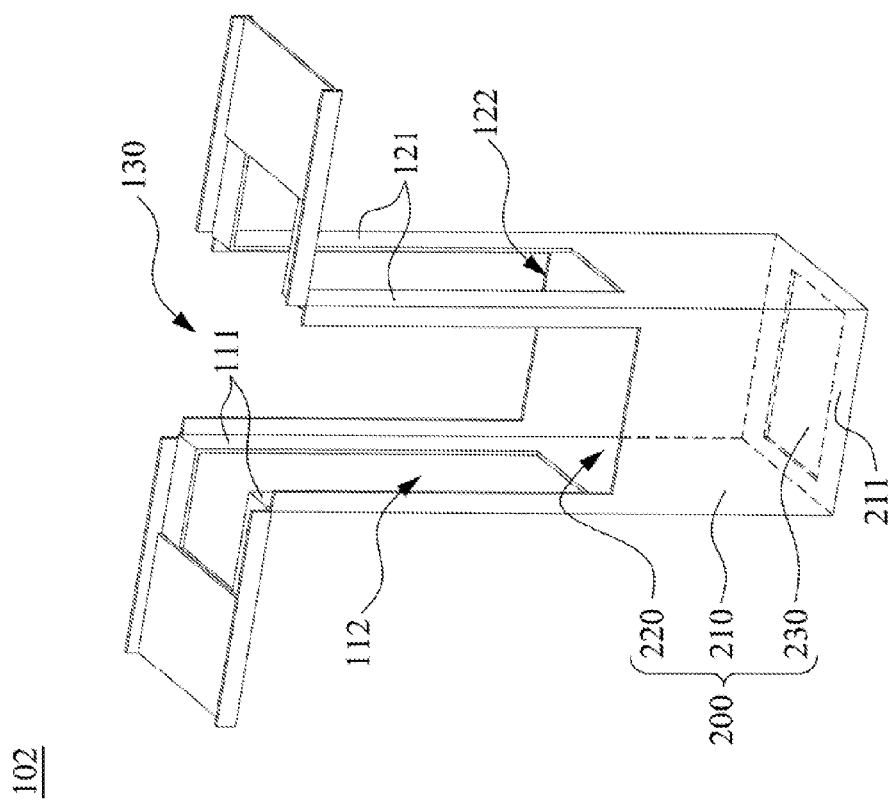
FIG. 5 is a perspective view of an optical inspection fixture according to a third embodiment of the disclosure.

FIG. 5 is a perspective view of an optical inspection fixture 102 according to a third embodiment of the disclosure. The optical inspection fixture 102 of the third embodiment and the optical inspection fixture 100 of the first embodiment are substantially the same, expect that, as shown in FIG. 5, the optical inspection fixture 102 further includes a sleeve 200. The sleeve 200 includes a tubular body 210, a receiving space 220 and an opening 230. One end of the tubular body 210 is connected to both of the first bracket 110 and the second bracket 120. The receiving space 220 is formed on the end of the tubular body 210 for receiving an optical conversion element. The opening 230 is formed on the other end of the tubular body 210 so that an inner surface 211 of the other end of the tubular body 210 is used to carry the optical conversion element. The receiving space 220 is connected to the opening 230 and the light traveling path 130.

Thus, since the inner surface 211 of the other end of the tubular body 210 surrounds the opening 230, the optical conversion element can be steadily placed on the sleeve 200, that is, the optical conversion element can be steadily placed on the inner surface 211 of the other end of the tubular body 210.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An optical inspection fixture comprising:
a first bracket provided with at least one first arm;
a second bracket provided with at least one second arm separated from the first arm, wherein the second bracket and the first bracket are separated from each other so that a light traveling path that lights from a light source are able to go through is defined therebetween; and
at least one loading surface disposed between the first bracket and the second bracket, and connected to at least one of the first bracket and the second bracket, for carrying an optical conversion element,
wherein, one end of the first bracket opposite to the loading surface is provided with a first carrying portion, and one end of the second bracket opposite to the loading surface is provided with a second carrying portion, and the light traveling path is arranged between the first carrying portion and the second carrying portion.

2. The optical inspection fixture of claim 1, wherein the first arm and the second arm respectively extend in a first axial direction and the loading surface extends in a second axial direction which is perpendicular to the first axial direction.

3. The optical inspection fixture of claim 2, wherein at least one first gap is formed between a plurality of the first arms, at least one second gap is formed between a plurality of the second arms, the light traveling path is connected to the first gap and the second gap, a plurality of the loading surfaces are disposed in the light traveling path, and the loading surfaces are respectively connected to the first arms and the second arms, and the first gap and the second gap respectively separate the loading surfaces.

4. The optical inspection fixture of claim 2, wherein when the number of the first arm and the number of the second arm are respectively single, and the number of the loading surface is two, the two loading surfaces are disposed in the light traveling path, and the two loading surfaces are respectively connected to the single first arm and the single second arm, and the single first arm and the single second arm are separated by the light traveling path.

5. The optical inspection fixture of claim 2, further comprising a sleeve, and the sleeve comprises:
a tubular body having one end thereof to connect to both of the first bracket and the second bracket;
a receiving space formed in the end of the tubular body; and
an opening formed on the other end of the tubular body so that the loading surface is formed on an inner surface of the other end of the tubular body, wherein the receiving space is connected to the opening and the light traveling path.

6. The optical inspection fixture of claim 2, wherein the first bracket is further provided with a first position-limited strip, the second bracket is further provided with a second position-limited strip, wherein the first position-limited strip and the second position-limited strip respectively extend in the first axial direction and the first position-limited strip and the second position-limited strip are used to prevent the optical conversion element from leaving the light traveling path.

7. An optical inspection device comprising:
an optical conversion element;
an optical inspection fixture comprising:
a first bracket provided with at least one first arm;
a second bracket provided with at least one second arm separated from the first arm, wherein the second bracket and the first bracket are separated from each other so as to define a light traveling path therebetween; and
at least one loading surface disposed between the first bracket and the second bracket, and connected to at least one of the first bracket and the second bracket, and the loading surface carrying the optical conversion element; and
a light source for emitting lights to a chip through the light traveling path via the optical conversion element,
wherein, one end of the first bracket opposite to the loading surface is provided with a first carrying portion, and one end of the second bracket opposite to the loading surface is provided with a second carrying portion, and the light traveling path is arranged between the first carrying portion and the second carrying portion.

8. The optical inspection device of claim 7, wherein the first arm and the second arm respectively extend in a first axial direction and the loading surface extends in a second axial direction which is perpendicular to the first axial direction.

9. The optical inspection device of claim 8, wherein at least one first gap is formed between a plurality of the first arms, at least one second gap is formed between a plurality of the second arms, the light traveling path is connected to the first gap and the second gap, a plurality of the loading surfaces are disposed in the light traveling path, and the loading surfaces are respectively connected to the first arms and the second arms, and the first gap and the second gap respectively separate the loading surfaces.

10. The optical inspection device of claim 8, wherein when the number of the first arm and the number of the second arm are respectively single, and the number of the loading surface is two, the two loading surfaces are disposed in the light traveling path, and the two loading surfaces are respectively connected to the single first arm and the single second arm, and the single first arm and the single second arm are separated by the light traveling path.

11. The optical inspection device of claim 8, wherein the optical inspection fixture further comprises a sleeve, and the sleeve comprises a tubular body, a receiving space and an opening, one end of the tubular body is connected to both of the first bracket and the second bracket, the receiving space is formed on the end of the tubular body, and the opening is formed on the other end of the tubular body so that the loading surface is formed on an inner surface of the other end of the tubular body, wherein the receiving space is connected to the opening and the light traveling path.

12. The optical inspection device of claim 8, wherein the first bracket is further provided with a first position-limited strip, the second bracket is further provided with a second position-limited strip, wherein the first position-limited strip and the second position-limited strip respectively extend in the first axial direction, and the first position-limited strip and the second position-limited strip are used to prevent the optical conversion element from leaving the light traveling path.

13. The optical inspection device of claim 7, wherein the optical conversion element is a lens or a diffuser.

* * * * *